United States Patent
Valdez et al.

(10) Patent No.: US 11,238,458 B2
(45) Date of Patent: Feb. 1, 2022

(54) SUPPORT COMBINATION CARDS FOR ECOMMERCE

(71) Applicant: VISA INTERNATIONAL SERVICE ASSOCIATION, San Francisco, CA (US)

(72) Inventors: Clyde Valdez, Santa Clara, CA (US); Clint Florez, Sammamish, WA (US); Peng Zhao, San Jose, CA (US); Amit Gupta, Dublin, CA (US); Miguel Lunaparra, Burlingame, CA (US); Mimi Le, Sunnyvale, CA (US); Swapneel Mahajan, Cupertino, CA (US); Jonathan Twichell, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 498 days.

(21) Appl. No.: 15/462,258

(22) Filed: Mar. 17, 2017

(65) Prior Publication Data
US 2017/0270525 A1 Sep. 21, 2017

Related U.S. Application Data

(60) Provisional application No. 62/309,818, filed on Mar. 17, 2016.

(51) Int. Cl.
*G06Q 20/40* (2012.01)
*G06Q 20/24* (2012.01)
*G06Q 20/26* (2012.01)
*G06Q 20/34* (2012.01)

(52) U.S. Cl.
CPC .......... *G06Q 20/405* (2013.01); *G06Q 20/24* (2013.01); *G06Q 20/26* (2013.01); *G06Q 20/34* (2013.01)

(58) Field of Classification Search
None
See application file for complete search history.

(56) References Cited

U.S. PATENT DOCUMENTS

| | | | | |
|---|---|---|---|---|
| 6,038,552 A | * | 3/2000 | Fleischl | G06Q 20/04 235/379 |
| 2005/0240527 A1 | * | 10/2005 | Goldman | G07F 7/1025 705/44 |
| 2009/0043663 A1 | * | 2/2009 | Prater | G06Q 40/12 705/16 |
| 2009/0292810 A1 | * | 11/2009 | Hotta | G06F 9/546 709/226 |
| 2010/0057624 A1 | * | 3/2010 | Hurt | G06Q 20/20 705/76 |
| 2013/0126604 A1 | * | 5/2013 | Tabor | G06Q 10/00 235/379 |
| 2013/0238455 A1 | * | 9/2013 | Laracey | G06Q 20/108 705/21 |
| 2014/0019352 A1 | * | 1/2014 | Shrivastava | G06Q 20/326 705/41 |

(Continued)

*Primary Examiner* — Christopher Bridges
*Assistant Examiner* — Toan Duc Bui
(74) *Attorney, Agent, or Firm* — Loeb & Loeb LLP (57) ABSTRACT

The claimed system and method allows for an electronic payment system to accept a single card that is both a debit card and a credit card. Further, a user may indicate a default value for the card regarding whether the card should be used as a debit card or a credit card.

9 Claims, 7 Drawing Sheets

(56) References Cited

U.S. PATENT DOCUMENTS

2015/0073926 A1* 3/2015 Royyuru .............. G06Q 20/352
705/17
2017/0200158 A1* 7/2017 Honey .................. G06Q 20/24
2017/0236118 A1* 8/2017 Laracey ............. G06Q 20/3674
705/44

* cited by examiner

SUPPORT COMBINATION CARDS FOR ECOMMERCE

This application claims priority to U.S. Provisional Patent Application 62/309,818 filed on Mar. 17, 2016, the contents of which are incorporated by reference for all purposes.

BACKGROUND

Debit cards traditionally are separate from credit cards. A debit card removes funds from an account virtually immediately while a credit card accumulates a balance and a minimum payment must be made at periodic intervals. As a credit card had more risk due to the uncertainly of payment, a higher fee is associated with a credit card which is often borne by a merchant. In many countries, credit and debit cards have different numbering schemes which means credit and debit cards are usually separate. At the same time, there are places and systems where a single card may be both a debit card and a credit card. It may be up to the user to indicate whether a given transaction is meant to be a debit transaction or a credit transaction.

Modern payment systems have developed which hold credit and debit card data in a secure manner and allow a user to select one of many cards to make a transaction. However, most payment systems do not have the capability to accept a card that is both a debit card and a credit card.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The claimed system and method allows for an electronic payment system to accept a single card that is both a debit card and a credit card. Further, a user may indicate a default value for the card regarding whether the card should be used as a debit card or a credit card.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

Debit cards traditionally are separate from credit cards. A debit card removes funds from an account virtually immediately while a credit card accumulates a balance and a minimum payment must be made at periodic intervals. As a credit card had more risk due to the uncertainly of payment, a higher fee is associated with a credit card which is often borne by a merchant. In many countries, credit and debit cards have different numbering schemes which means credit and debit cards are usually separate. At the same time, there are places and systems where a single card may be both a debit card and a credit card. It may be up to the user to indicate whether a given transaction is meant to be a debit transaction or a credit transaction.

Modern payment systems have developed which hold credit and debit card data in a secure manner and allow a user to select one of many cards to make a transaction. However, most payment systems do not have the capability to accept a card that is both a debit card and a credit card. The claimed system and method addresses this issue by creating a solution to the problem, Referring to FIG. 1, a method of configuring an electronic token based payment server is disclosed. At block 100, account data may be received for an account wherein the account data represents a payment instrument for credit and debit transaction. Account data may include a personal account number (PAN), an expiration number, a CVC number, a billing address, a phone number, etc. The account data may represent a single physical card where the card may function as both a debit and credit card.

Figure 2:
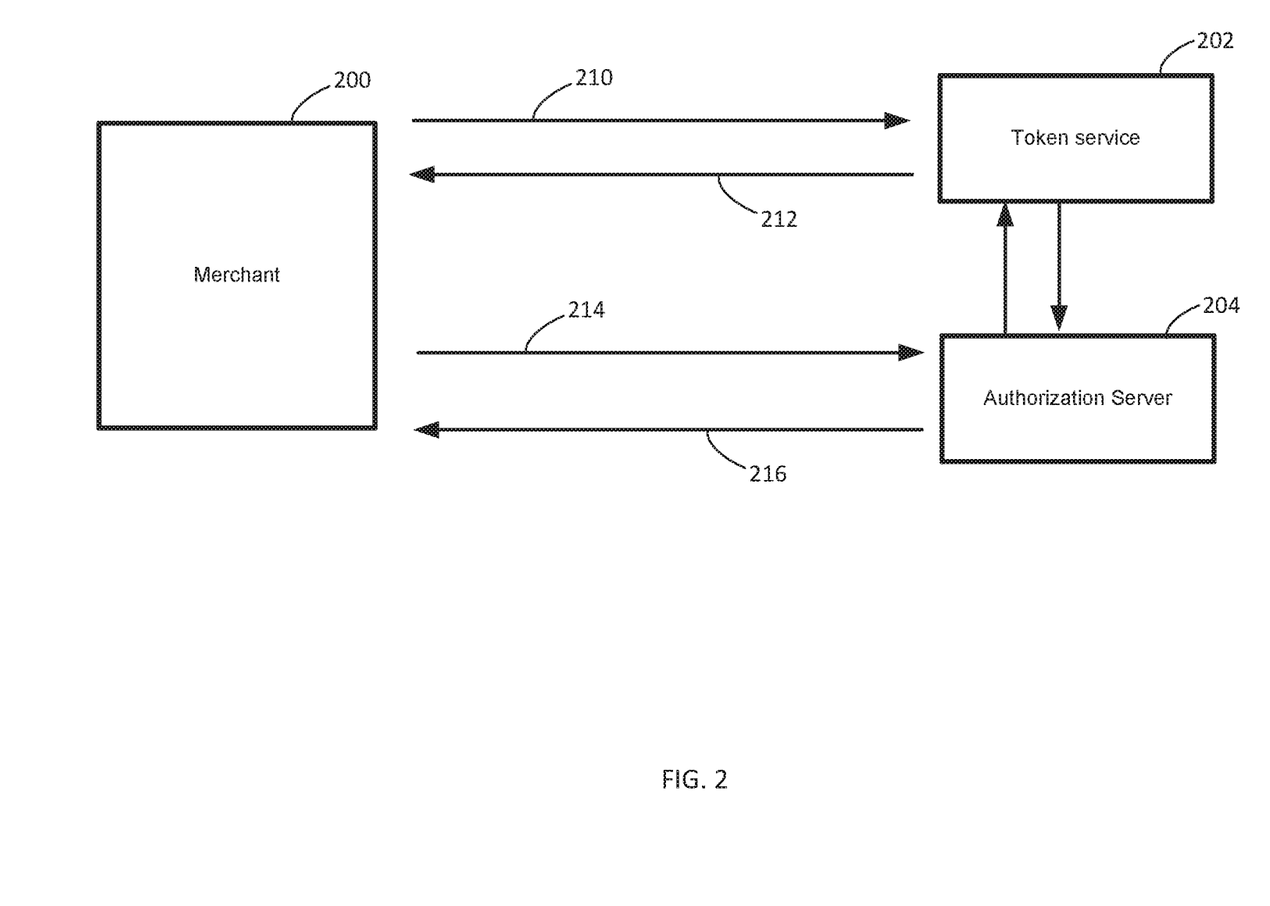
FIG. 2 is an illustration of the operation of a sample payment system.

At block 110, the account data and a payment server account may be stored as being linked in a memory at a payment server 408 (discussed below with respect to FIG. 4). The storage may be instantiated at the payment server 408 in a secure manner. In some embodiments, the account data may be converted into a token that represents a personal account number for use in merchant-facing transactions. FIG. 2 may describe at a high level how tokens may operate while using a payment server 408. In a first step, a merchant 200 may issue a request 210 to a token service 202 to receive payment data for a consumer. In a next step, the token service 202 may generate a response 212 that includes a token which may takes the place of a personal account number (PAN) of the user. The token may be able to be converted by the token service into the PAN but anyone else that received the token would be unable to make sense of it. The merchant may request via communication 214 authorization on behalf of the customer to an authorization server 204 using the received token as the payload. The authorization server 204 request confirmation of the token via communication with the token service 202 and provide an authorization response 216. The token alone may be useless but the token server 202 may translate the token into a PAN while the PAN may not be exposed over a network.

Figure 1:
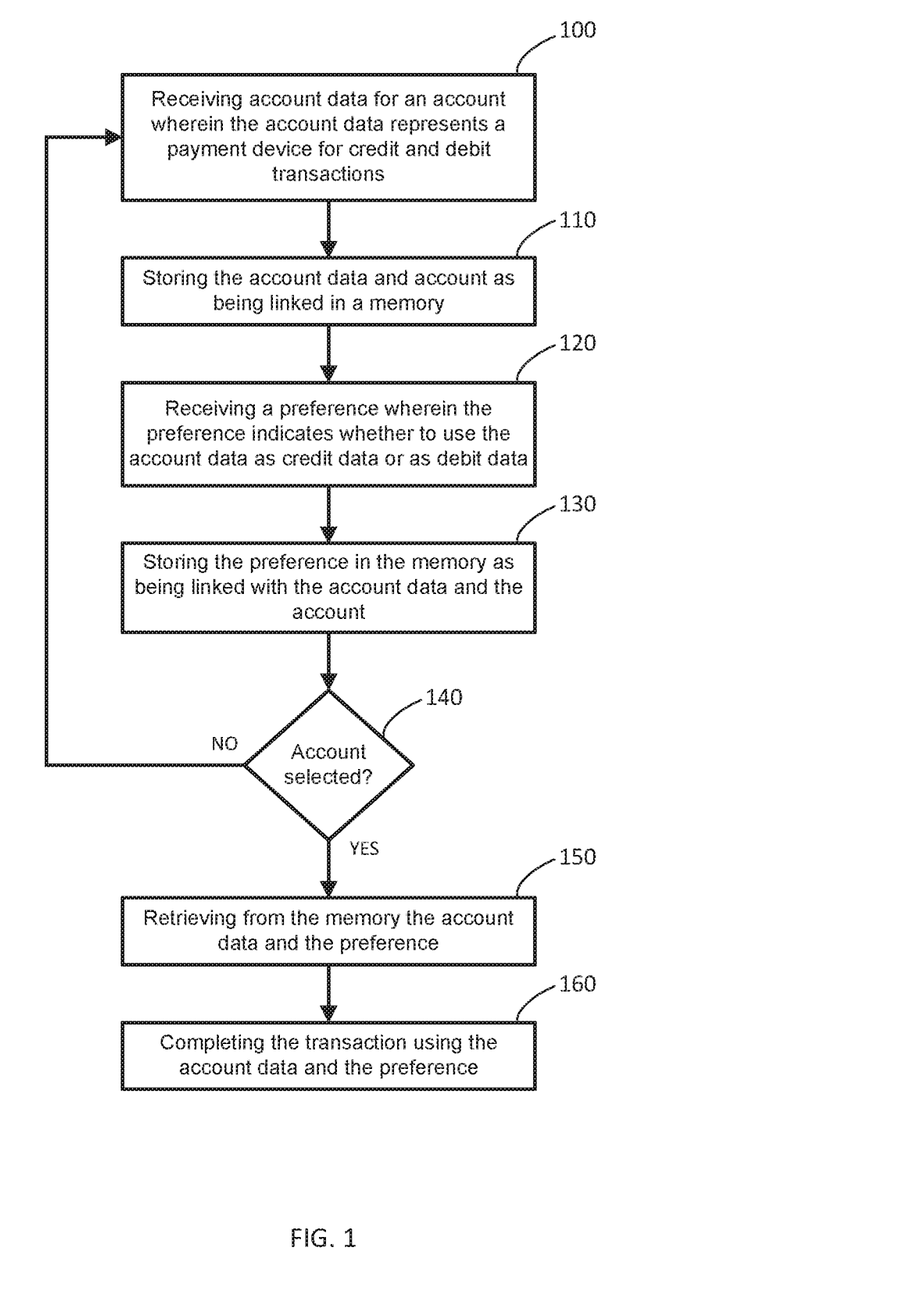
FIG. 1 is an illustration of a method of adding a single card with both credit and debit capability to a payment server.

At block 120, a preference may be received where the preference indicates whether to use the combination payment instrument account data as credit data or as debit data. The user may indicate the preference by selecting a checkbox, using a drop down menu, issuing a command, etc. In some additional embodiments, the preference may be a default value and the user may have to change it if they do not accept the default preference.

At block 130, the preference may be stored in the memory as being linked with the account data and the payment service account. The preference may be stored as a flag or any other appropriate indication that the default has been set and what the default represents. For example, a "1" may represent that the account be stored as a credit card and a "0" may represent that the account be stored as a debit card.

At block 140, it may be determined whether the payment account has been selected to be used for a transaction. At block 150, in response to the payment service account being selected to be used for a transaction, the account data and the preference may be retrieved from the memory. Again, the account data may be a PAN, a token, or any other form of data that may be used to complete a transaction.

At block 160, the transaction may be completed using the account data and the preference. In the case where the user has set the preference, the user may not be asked whether to proceed with a debit transaction or a credit transaction as the preference may be used to make the determination. In some embodiments, the user may be able to override the preference by selecting credit or debit on the display. Similarly, future transactions using the account data may proceed using the preference as a default.

Figure 4:
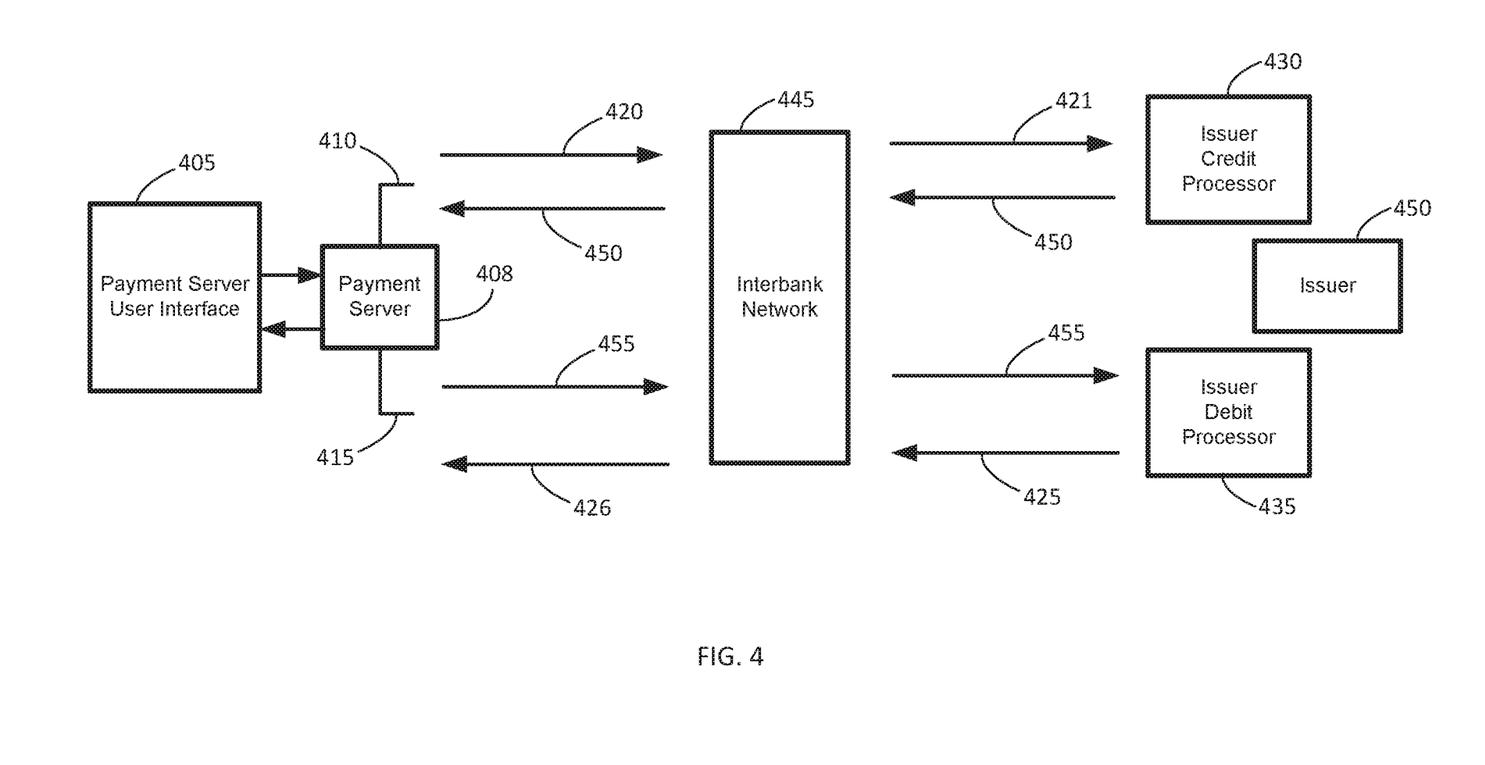
FIG. 4 is an illustration of another embodiment of adding a combination payment device to a payment server.

Referring to FIG. 4, another embodiment of adding a combination card to a payment server 408 may be illustrated. In the payment server user interface 405, such as a web browser, a user may select to add a card. The card data (credit and debit) such as a PAN, expiration CVV2, etc., may be entered via the user interface 405. The payment server 408 operates differently from a prior art payment server in that may be modified to recognize that a single PAN may have both credit and debit associations, such as is found in some countries including Brazil. The payment server 408 may include a special function that receives a personal account number (PAN) of a card and determines via the issuer identification number or, in previous terminology, a bank identification number (BIN), that the payment instrument is a debit, credit, or combination card.

The payment data may be communicated to the payment server 408 and the payment server 408 may recognize that the card data is associated with a combination (debit and credit) card. After recognizing the card as having dual functions, the payment server 408 may submit both a credit account verification request at block 410 and a debit account verification request at block 415. Each issuer processor system (debit and credit) may communicate the verification request 420 425 to the relevant issuers processors 430 435 and, ultimately, to an issuer 440. This may include communicating the verification request over a payment system network 445 which includes a special build network to handle payment communications. At the payment server 408, the response from the issuer 440 may be communicated through the debit channels 455 and the credit channels 450. If both the debit and credit function are approved, both may be added to the payment system, while if only debit functions are approved, then only debit functions may be added to the payment system. Logically, if only credit functions are approved, then only credit functions may be added to the payment system.

Figure 5:
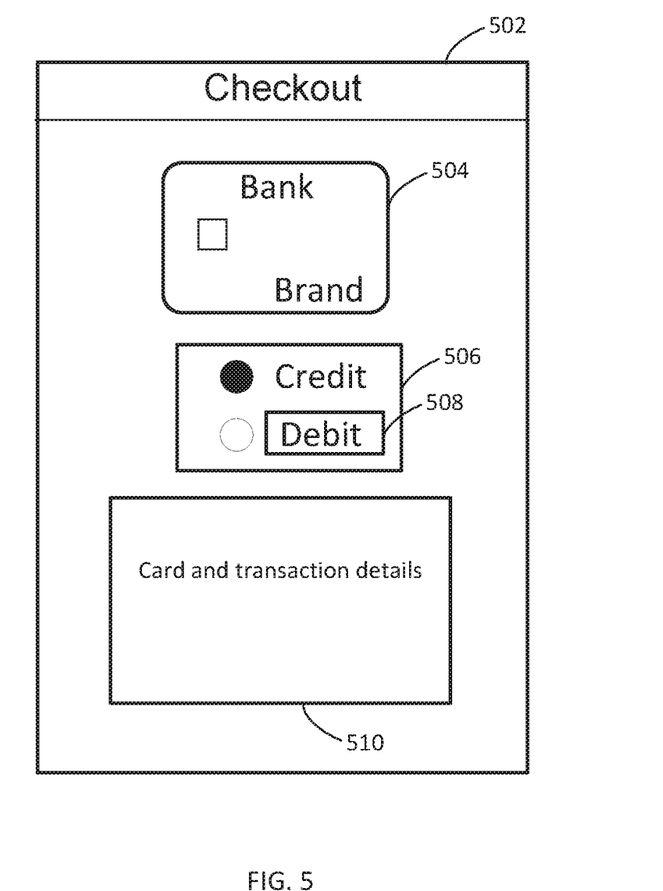
FIG. 5 is a graphical user interface that illustrates that credit functionality is available but debit functionality is not available.
Figure 6:
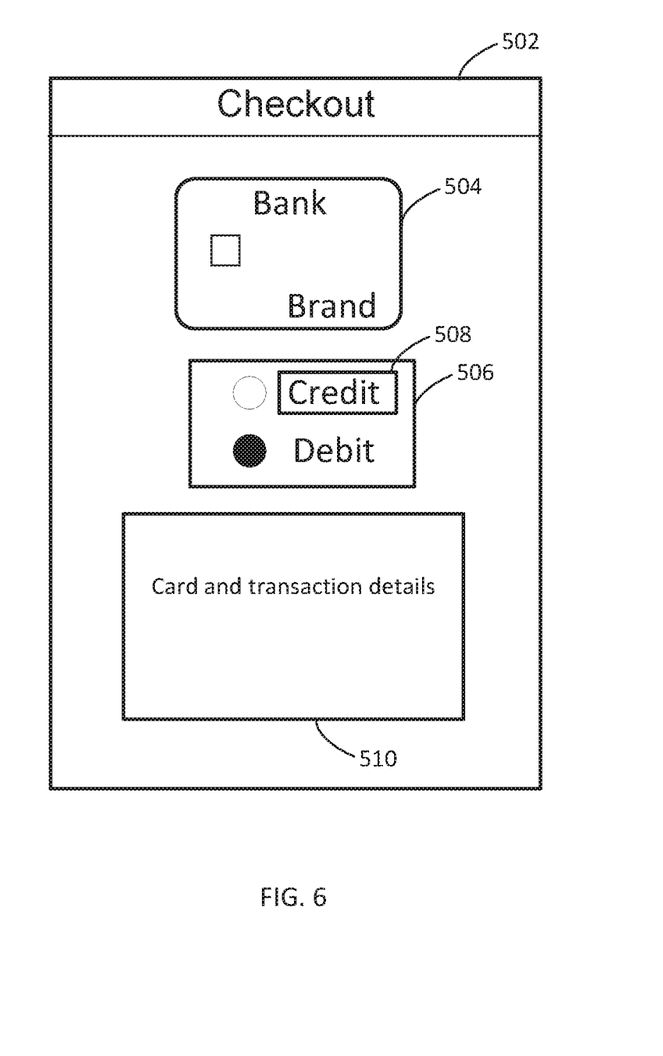
FIG. 6 is a graphical user interface that illustrates that debit functionality is available but credit functionality is not available.
Figure 7:
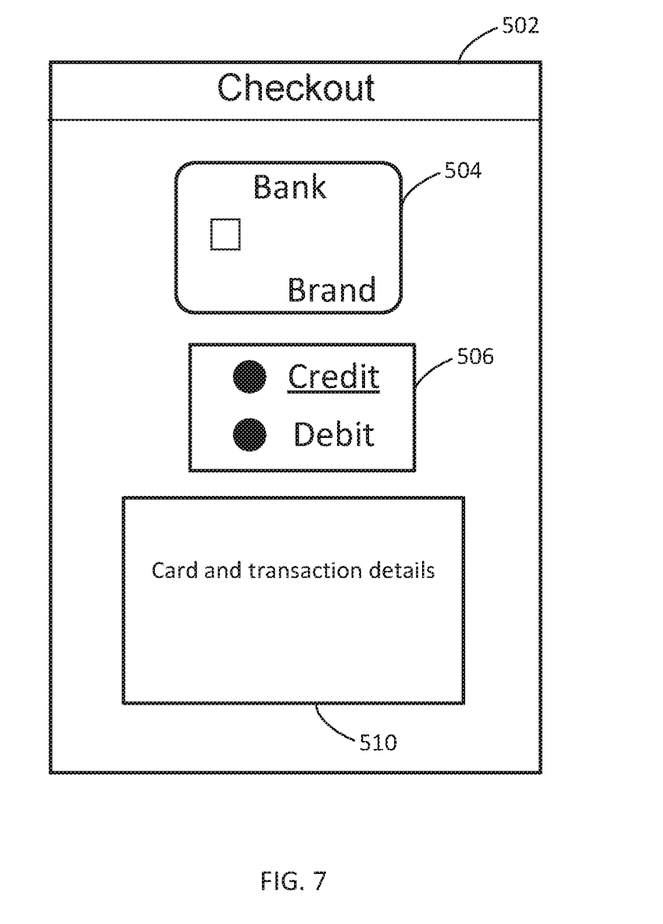
FIG. 7 is a graphical user interface that illustrates that credit and debit functionality is available and credit functionality is the default for the payment device.

Referring to FIGS. 5-7, graphical user interfaces supported at the user interface 405 that may result after adding a combo card may be illustrated. In FIG. 5, a screen illustration 502 may show an image 504 of the card and a status block 506 may show via the filled circle that the credit function may have been approved but the debit function was not approved, as illustrated by the unfilled circle. A graphical selection tool 508 may be selectable to allow a user to request re-checking whether the debit function is now available by causing the payment server 408 to resubmit the application request. Other information about the card may be available in a text box 510.

In FIG. 6, debit may have been approved but credit was not approved as illustrated by the appropriate fill on the indicator circles. As above, the highlight 508 may allow the user to request a re-check of the availability of credit functions for that payment instrument. In FIG. 7, both debit and credit functions may be approved and both functionalities may be available, with a default function (debit or credit) being listed first and being preselected. No graphical selection tool 508 is necessary as there is no need to resubmit a request for approval of one previously-denied capabilities.

The request for re-submission of an approval may be available because, for example, an issuer may have a longer approval process for one type of instrument compared to the other. In another example, a user's credit score may have improved over time and the issuer would now be ready to approve a credit card for a previously-denied consumer.

Therefore, if the user believes a function should be available but it is indicated as being unavailable, the user may select the graphical selection tool 508 function and a repeat request for approval may occur. As an example, if the user is confident credit functionality should be available at a merchant but credit functionality is indicated as being unavailable, the user may select the credit function and a repeat request for approval may be communicated. The graphical selection tool 508 may include descriptive text indicating that the user can check on the availability of the missing function by selecting the graphical selection tool 508.

The use of combo cards may require additional codes to be used as part of the payload when a transaction approval is requested. For example, in a known place in a packet, a code of "2" may indicate a credit transaction is being requested and a "3" may indicate a debit card is being requested. The authorization server 204 may recognize the digit and may route the transaction to the appropriate approval process, such as the credit processor 430 or debit processor 435.

As a result of the method, several technical problems may be solved. First, no payment service to date has been able to handle that a single payment card may operate as a debit and a credit card. By adding the preference options and related fields in a memory, the payment account can mimic the payment card itself by acting as both a debit card and a credit card depending on the desires of a user. Further, as the payment system takes concept even further by allowing a user to set either credit or debit as the default use of the payment device. In the past, payment systems were not even capable of using a same payment card in a payment service for both a credit and debit transaction. Similarly, the payment system may have to indicate the transaction type (debit or credit) and point of sale devices may have a display where a user may select between using a card for debit or credit functionality.

As a result, a user may be able to use a payment server 408 and still have the option to use debit services or credit services all the while only entering one card into the payment server 408. Users will be more likely to use the payment server as they will have more payment options than previous services. Further, the capability of the payment server 408 is extended to be able to support combination cards. Absent this improved functionality, a user may have been forced to register a payment instrument as a credit card in one payment service and add the same payment instrument as a debit card in a different payment service and then be required to select the payment service based on the type of transaction desired, perhaps foregoing desirable incentives available through one payment service and not the other.

It is well known that in some locations a debit card may be processed as a credit transaction. The combination card described herein is not to be confused with such a debit card. Such a debit card may participate in a transaction via a credit card process, but funds are still settled directly from the user's bank account, e.g., a checking account, and are not accumulated for a payment after a closing period. The combination card described herein may participate as a debit card with funds directly taken from a user account and may also participate in credit transactions following a normal credit settling process.

Figure 3:
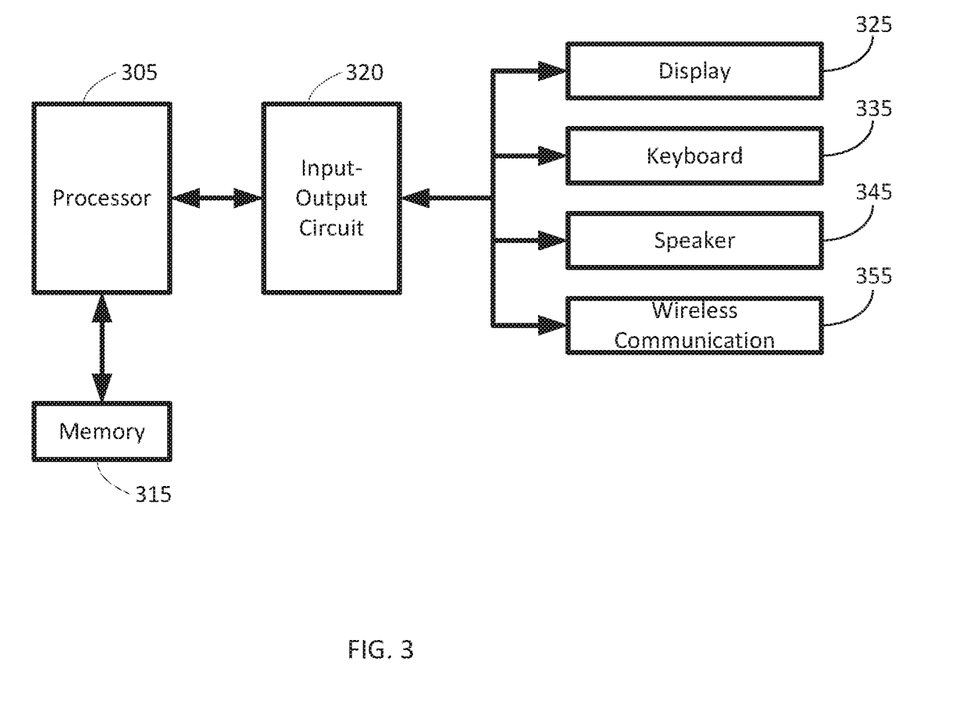
FIG. 3 is an illustration the hardware that may be part of the system and used by the method.

FIG. 3 may illustrate the physical elements that may be used by the portable computing device 240. The portable computing device 240 may have a processor 305 which may be physically configured according to computer executable instructions. A memory 315 may be in communication with the processor 305 and the memory may store data that may be useful to the processor 305. The processor 305 may be in communication with an input-output circuit 315 which may manage communications to and from the processor 305. The input-output circuit 315 may be in communication with a display 325 which may be touch sensitive. The input-output circuit 315 may be in communication with an input device such as a touch screen, an input pad, a mouse, a keyboard, etc. The input-output circuit 315 may be in communication with a speaker 345 which may be used to communicate messages to the user by voice. The input-output circuit 315 may be in communication with a wireless communication circuit which may be used to communicate wirelessly in a variety of forms such as via Bluetooth, WiFi, cellular, or any other appropriate RF communication form and format.

The user devices, computers and servers described herein may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving payment systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method of adding a single combination card with both credit and debit capability to a same payment server of a payment system, comprising:
   receiving account data at the same payment server, wherein the account data represents the single combination card, the account data including a single personal account number (PAN) for the combination card;
   determining, at the same payment server, that the single combination card is capable of participating in both credit and debit transactions based on the single PAN;
   in response to determining that the single combination card is capable of participating in both credit transactions and debit transactions, concurrently sending two verification requests via the same payment server, the two verification requests including a credit account verification request and a debit account verification request, the credit account verification request being a request to a credit issuer processor system to check if credit function is available for future transactions with the combination card, the debit account verification request being a request to a debit issuer processor system to check if debit function is available for future transactions with the combination card;
   storing the account data and payment service account data as being linked in a memory of the same payment server to provide a payment service account at the payment server;
   adding credit functionality to the payment service account if an approval to the credit account verification request is received;
   adding debit functionality to the payment service account if an approval to the debit account verification request is received;
   presenting to a user, at a graphical user interface of the payment server, an indication of approval or denial for both of the credit account verification request and the debit account verification request;
   providing, at the graphical user interface, a graphical selection tool that allows the user to request resubmission of the credit account verification request to the credit issuer processor system if a denial of the credit account verification request is indicated at the graphical user interface;
   providing, at the graphical user interface, a graphical selection tool that allows the user to request resubmission of the debit account verification request to the debit issuer processor system if a denial of the debit account verification request is indicated at the graphical user interface;
   receiving a default selection preference to use the account data representing the single combination card as one of a credit card in which a balance accumulates on a credit account of a user, and a debit card in which funds are directly taken from an account of the user;
   storing the default selection preference in the memory of the same payment for future transactions with the payment service account;
   in response to the payment service account being selected to be used for a transaction, retrieving from the memory of the same payment the account data and the default selection preference;
   preparing a payload packet for a transaction approval, the payload packet including a first indicator if the default selection preference is for a credit transaction or a second indicator if the default selection preference is for a debit transaction;

sending the payload packet to an authorization server wherein the authorization server routes the payload packet to a credit processor if the payload packet includes the first indicator or to a debit processor if the payload packet includes the second indicator; and
completing the transaction using the account data and the default selection preference.

2. The method of claim 1, wherein the single combination card is a single physical card.

3. The method of claim 1, wherein the account data is a token that represents the PAN.

4. The method of claim 1, wherein future transactions using the account data use the preference as a default.

5. The method of claim 1, wherein if credit approval is not received, indicating on the payment system that credit functionality is not available.

6. The method of claim 1, wherein if the debit approval is not received, indicating on the payment system that debit functionality is not available.

7. The method of claim 1, further comprising receiving a selection for overriding or changing the default selection.

8. A system for adding a single combination card with both credit and debit capability to a same payment server of a payment system, comprising:
a memory for storing computer executable instructions;
a processor in communication with the memory, the processor being physically configured according to the computer executable instructions to:
receive account data at the same payment server, wherein the account data represents the single combination card, the account data including a single personal account number (PAN) for the combination card;
determine that the single combination card is capable of participating in both credit and debit transactions based on the single PAN;
in response to a determination that the single combination card is capable of participating in both credit transactions and debit transactions, concurrently send two verification requests via the same payment server, the two verification requests including a credit account verification request and a debit account verification request, the credit account verification request being a request to a credit issuer processor system to check if credit function is available for future transactions with the combination card, the debit account verification request being a request to a debit issuer processor system to check if debit function is available for future transactions with the combination card;
store the account data and payment service account data as being linked in the memory to provide a payment service account at the payment server;
add credit functionality to the payment service account if an approval to the credit account verification request is received;
add debit functionality to the payment service account if an approval to the debit account verification request is received;
send for presentation to a user, at a graphical user interface of the payment server, an indication of approval or denial for both of the credit account verification request and the debit account verification request;
provide, at the graphical user interface, a graphical selection tool that allows the user to request resubmission of the credit account verification request to the credit issuer processor system if a denial of the credit account verification request is indicated at the graphical user interface;
provide, at the graphical user interface, a graphical selection tool that allows the user to request resubmission of the debit account verification request to the debit issuer processor system if a denial of the debit account verification request is indicated at the graphical user interface;
receive a default selection preference to use the account data representing the single combination card as one of a credit card in which a balance accumulates on a credit account of a user, and a debit card in which funds are directly taken from an account of the user;
store the default selection preference in the memory for future transactions with the payment service account;
in response to the payment service account being selected to be used for a transaction, retrieve from the memory the account data and the default selection preference;
prepare a payload packet for a transaction approval, the payload packet including a first indicator if the default selection preference is for a credit transaction or a second indicator if the default selection preference is for a debit transaction;
send the payload packet to an authorization server wherein the authorization server routes the payload packet to a credit processor if the payload packet includes the first indicator or to a debit processor if the payload packet includes the second indicator; and
complete the transaction using the account data and the default selection preference.

9. A non-transitory computer-readable tangible medium for storing instructions to:
receive account data at a same payment server, wherein the account data represents the single combination card, the account data including a single personal account number (PAN) for the combination card;
determine, at the same payment server, that the single combination card is capable of participating in both credit and debit transactions based on the single PAN;
in response to a determination that the single combination card is capable of participating in both credit transactions and debit transactions, concurrently send two verification requests via the same payment server, the two verification requests including a credit account verification request and a debit account verification request, the credit account verification request being a request to a credit issuer processor system to check if credit function is available for future transactions with the combination card, the debit account verification request being a request to a debit issuer processor system to check if debit function is available for future transactions with the combination card;
store the account data and payment service account data as being linked in a memory of the same payment server to provide a payment service account at the payment server;
add credit functionality to the payment service account if an approval to the credit account verification request is received;
add debit functionality to the payment service account if an approval to the debit account verification request is received;
present to a user, at a graphical user interface of the payment server, an indication of approval or denial for both of the credit account verification request and the debit account verification request;

provide, at the graphical user interface, a graphical selection tool that allows the user to request resubmission of the credit account verification request to the credit issuer processor system if a denial of the credit account verification request is indicated at the graphical user interface;

provide, at the graphical user interface, a graphical selection tool that allows the user to request resubmission of the debit account verification request to the debit issuer processor system if a denial of the debit account verification request is indicated at the graphical user interface;

receive a default selection preference to use the account data representing the single combination card as one of a credit card in which a balance accumulates on a credit account of a user, and a debit card in which funds are directly taken from an account of the user;

store the default selection preference in the memory of the same payment for future transactions with the payment service account;

in response to the payment service account being selected to be used for a transaction, retrieve from the memory of the same payment the account data and the default selection preference;

prepare a payload packet for a transaction approval, the payload packet including a first indicator if the default selection preference is for a credit transaction or a second indicator if the default selection preference is for a debit transaction;

send the payload packet to an authorization server wherein the authorization server routes the payload packet to a credit processor if the payload packet includes the first indicator or to a debit processor if the payload packet includes the second indicator; and complete the transaction using the account data and the default selection preference.

\* \* \* \* \*